(No Model.)
E. L. WINEY.
BICYCLE.
No. 353,904. Patented Dec. 7, 1886.
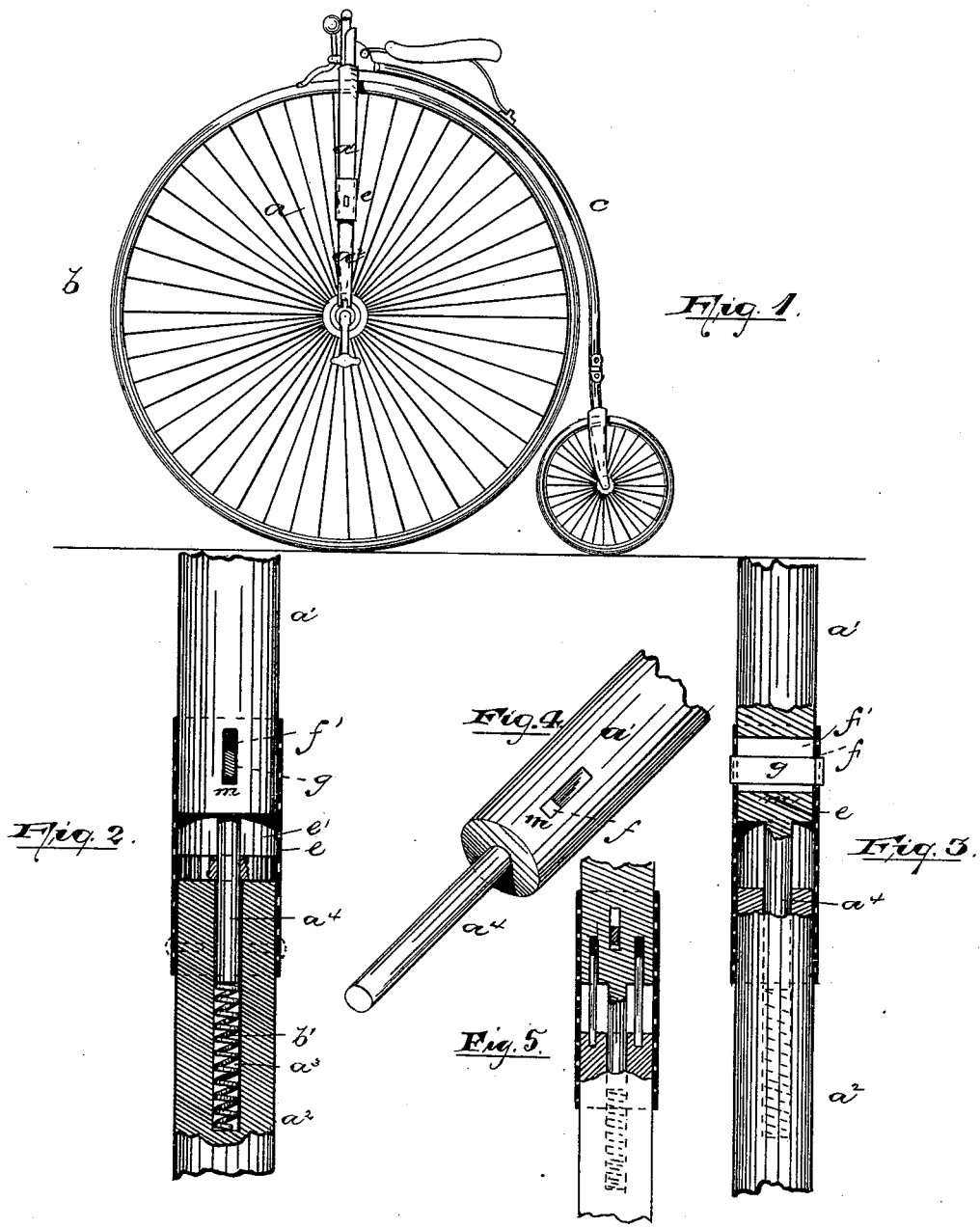
WITNESSES.
Frdk. F. Campbell.
Jose[?]
INVENTOR.
Elijah L. Winey,
by Drake & Co. ATTORNEYS.

UNITED STATES PATENT OFFICE.

ELIJAH L. WINEY, OF EAST ORANGE, NEW JERSEY.

BICYCLE.

SPECIFICATION forming part of Letters Patent No. 353,904, dated December 7, 1886.

Application filed February 10, 1886. Serial No. 191,388. (No model.)

*To all whom it may concern:*

Be it known that I, ELIJAH L. WINEY, a citizen of the United States, residing at East Orange, in the county of Essex and State of New Jersey, have invented certain new and useful Improvements in Bicycles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates more particularly to certain improvements in that class of bicycles, such as those commonly known in the market as "Columbias," having a large front wheel and small rear wheel connected with or by a curved "perch" or "backbone," and having a fork in connection with said perch, in and between the prongs or bifurcations of which the said front wheel has its bearings.

The object of the invention is to obtain in riding increased ease, and to reduce the danger caused by the liability of the rider taking a "header," or falling headforemost over the wheel when the latter suddenly strikes an obstacle.

The invention consists in the arrangements and combinations of parts, substantially as will be hereinafter set forth, and finally embodied in the clauses of the claim.

Referring to the accompanying drawings, in which like letters indicate corresponding parts in each of the several figures, Figure 1 is a side elevation of a bicycle, showing the relation of the improvements to the adjacent parts. Fig. 2 is a sectional detail illustrating the construction of the joint in one of the prongs or limbs of the fork. Fig. 3 is a similar view, the line of section being taken at right angles to that of Fig. 2. Fig. 4 is a perspective view, showing a dowel-pin, which extends from one of the sections into a hole or boring of corresponding diameter formed in the other; and Fig. 5 is another sectional view, showing certain additional features of improvement.

In said drawings, $a$ is the ordinary fork, in which the front wheel, $b$, of the bicycle has its bearings, the prongs or bifurcations of which fork may be either hollow or solid. These are jointed at about midway between the lower bearing end at which the wheel is journaled and where it joins with the perch or backbone $c$. The sections $a'$ $a^2$ of each of said prongs or limbs of the fork have arranged between them a spring, $b'$, which takes the weight of the rider and the jar or vibration caused by riding, the said spring being arranged in a suitable recess or socket formed in or at the end of one of said sections to conceal and protect the spring and prevent it from catching the rider's garments, and being otherwise objectionable, because of its exposure.

To prevent looseness between the sections and to prevent the parts from becoming detached, I prefer to construct the joint substantially as shown in Figs. 2 and 3, in which the end of the section $a^2$ is shown to be provided with a boring or hole, $a^3$, for a dowel, $a^4$, and a spring, $b'$, of sufficient power to more than carry its proportion of the weight of the upper portions of the bicycle and the rider. The opposite section, $a'$, carries the dowel referred to. Said dowel is preferably integral with the body of the section, though it may be a pin secured in a suitable socket formed in the said section. Said dowel rests on top of the spring and fits closely into the boring, so that there will be no lateral play, but only a longitudinal movement.

To secure additional stiffness and strength, I fix, by brazing or other means or processes, upon one of the sections a band or collar, $e$, which projects beyond the extremity of said section and forms a socket, $e'$, in which the co-operating section fits closely and slides. This band, and the section working therein, are transversely perforated, as at $f$ $f'$, to receive a key, $g$. Said key $g$ fits closely in the perforation $f$ of the band, so that it holds a fixed relation to the said band. The perforation $f'$ is in the form of a slot, so that the section is allowed a limited freedom of movement, as will be readily understood upon reference to Figs. 2 and 3.

In riding, while moving along under ordinary conditions, the spring $b'$ holds the lower abutment or stop, $m$, which prevents the detachment of parts up against the key. Should the wheel strike an obstacle, it and its bearings are thrown up and the spring takes the concussion, relieving the rider thereof. The reflex action of the spring actuates the upper section so that it is lifted, and this action counteracts to a large extent the momentum of the rider, so that the danger of his falling forward is reduced.

I may gain increased stiffness and strength by providing additional dowel-pins $n$ $n$, as in Fig. 5, and may introduce a rubber cushion between the ends of the sections, as at $o$ in Fig. 2, to prevent a too sudden contact of ends, and other changes or variations from the device herein shown may be made without departing from the spirit of this invention.

I am aware that in the patent to Smith and Walker, dated June 22, 1869, No. 91,682, a velocipede is shown in which the backbone is fitted loosely to the head of the fork and rests on a spring arranged around said head, so that the weight of the rider comes on the one said spring. This construction will cause a hammering on the head of the fork, which is so near the rider's hands as to be disagreeable and to require an additional spring to relieve or reduce the concussion. In the improved device this looseness at the junction of the fork and perch, which is objectionable, in that it weakens the vehicle where great strength is required, and is otherwise undesirable, is avoided, and the weight of the body is supported by two springs disposed not only at a distance from the hands, but also from one another, so that the hammering above referred to is not felt at the hands, and the necessity for a spring to relieve the hands is avoided.

What I claim as new is—

1. The improved fork for bicycles combining therein prongs or bifurcations, the sections $a'$ $a^2$ of each of which are provided with a dowel, a dowel-hole, a spring, a collar, perforations $f f'$, and a key, all said parts being arranged and adapted to operate substantially as and for the purposes set forth.

2. In combination with the sections $a'$ $a^2$ of the prongs or bifurcations of a bicycle-fork, an interposed spring, a dowel, $a^4$, working in a dowel-hole in the co-operating section, additional dowels $n$ $n$, a band, $e$, perforations $f f'$, and a key, $g$, all said parts being arranged and combined substantially as set forth.

In testimony that I claim the foregoing I have hereunto set my hand this 1st day of February, 1886.

ELIJAH L. WINEY.

Witnesses:
CHARLES H. PELL,
FREDK. F. CAMPBELL.